(12) United States Patent
Liu (10) Patent No.: US 12,477,031 B2
(45) Date of Patent: Nov. 18, 2025

(54) FILE SENDING METHOD AND APPARATUS, AND ELECTRONIC DEVICE

(71) Applicant: VIVO MOBILE COMMUNICATION CO., LTD., Dongguan (CN)

(72) Inventor: Lei Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/139,926

(22) Filed: Apr. 26, 2023

(65) Prior Publication Data

US 2024/0089313 A1    Mar. 14, 2024

Related U.S. Application Data

(63) Continuation of application No. PCT/CN2021/126341, filed on Oct. 26, 2021.

(30) Foreign Application Priority Data

Oct. 28, 2020  (CN) .......................... 202011174568.7

(51) Int. Cl.
G06F 16/13     (2019.01)
G06F 3/0484    (2022.01)
(Continued)

(52) U.S. Cl.
CPC ............ H04L 67/06 (2013.01); G06F 40/205 (2020.01); H04L 51/04 (2013.01); H04L 51/08 (2013.01)

(58) Field of Classification Search
CPC ......... H04L 67/06; H04L 51/04; H04L 51/08; G06F 40/205
See application file for complete search history.

(56) References Cited

U.S. PATENT DOCUMENTS 6,389,427 B1 *  5/2002  Faulkner ................. G06F 16/16
                                                   707/828
6,693,729 B1 *  2/2004  Bloomfield ........ H04N 1/00204
                                                   379/100.09
(Continued)

FOREIGN PATENT DOCUMENTS

CN       106777332 A      5/2017
CN       107239199 A     10/2017
(Continued)

OTHER PUBLICATIONS

International Search Report issued in corresponding International Application No. PCT/CN2021/126341, mailed Jan. 26, 2022, 4 pages.
(Continued)

*Primary Examiner* — Umar Cheema
*Assistant Examiner* — Golam Mahmud
(74) *Attorney, Agent, or Firm* — IPX PLLC (57) ABSTRACT

A file sending method and an electronic device are provided. The method includes: in a case that a conversation interface is displayed, receiving first input of a user. The conversation interface includes at least one file. The first input is input performed by the user for a target file in the at least one file. The method further includes updating the conversation interface to a first interface in response to the first input. The first interface is a desktop or a target interface displayed based on a storage path of the target file. The desktop includes an identifier of the target file. The target interface includes the target file. The method also includes receiving second input of the user. The method additionally includes in response to the second input, sending the target file by using the target application program.

6 Claims, 8 Drawing Sheets

(51) Int. Cl.
*G06F 3/0485* (2022.01)
*G06F 16/16* (2019.01)
*G06F 40/205* (2020.01)
*H04L 12/58* (2006.01)
*H04L 51/04* (2022.01)
*H04L 51/08* (2022.01)
*H04L 67/06* (2022.01)

(56) References Cited

U.S. PATENT DOCUMENTS

| | | | | |
|---|---|---|---|---|
| 7,697,520 | B2 * | 4/2010 | Hopkins | H04L 67/1061 |
| | | | | 709/224 |
| 8,346,803 | B2 * | 1/2013 | Chang | G06F 3/0482 |
| | | | | 715/780 |
| 10,037,339 | B1 * | 7/2018 | Kleinpeter | H04L 63/10 |
| 10,592,098 | B2 * | 3/2020 | Chaudhri | G06F 3/04817 |
| 2004/0162877 | A1 | 8/2004 | Van Dok et al. | |
| 2006/0085508 | A1 | 4/2006 | Uchida et al. | |
| 2007/0061308 | A1 * | 3/2007 | Hartwell | G06F 16/168 |
| 2008/0147746 | A1 | 6/2008 | Bauchot et al. | |
| 2012/0265817 | A1 | 10/2012 | Bruno et al. | |
| 2013/0159304 | A1 * | 6/2013 | Halpern, III | G06F 12/16 |
| | | | | 707/E17.044 |
| 2013/0227236 | A1 * | 8/2013 | Flynn | G06F 12/0292 |
| | | | | 711/172 |
| 2013/0283144 | A1 | 10/2013 | Roh et al. | |
| 2014/0136934 | A1 | 5/2014 | Osawa | |
| 2015/0193108 | A1 * | 7/2015 | Li | G06F 40/131 |
| | | | | 715/748 |
| 2017/0308516 | A1 * | 10/2017 | Steplyk | H04L 51/08 |
| 2017/0336943 | A1 * | 11/2017 | Chaudhri | H04L 51/18 |
| 2017/0359712 | A1 * | 12/2017 | Meredith | H04L 65/1063 |
| 2019/0121511 | A1 * | 4/2019 | Gelernter | H04L 51/08 |
| 2020/0218694 | A1 * | 7/2020 | Zeng | G06F 16/13 |

FOREIGN PATENT DOCUMENTS

| | | |
|---|---|---|
| CN | 109343755 A | 2/2019 |
| CN | 110019058 A | 7/2019 |
| CN | 110287145 A | 9/2019 |
| CN | 112399006 A | 2/2021 |
| JP | 6143437 B2 | 6/2017 |

OTHER PUBLICATIONS

First Office Action issued in related Chinese Application No. 202011174568.7, mailed Apr. 27, 2021, 8 pages.

Second Office Action issued in related Chinese Application No. 202011174568.7, mailed Nov. 18, 2021, 6 pages.

Extended European Search Report issued in related European Application No. 21885136.8, mailed Mar. 27, 2024, 8 pages.

* cited by examiner

FILE SENDING METHOD AND APPARATUS, AND ELECTRONIC DEVICE

CROSS-REFERENCE TO RELATED APPLICATIONS

This application is a continuation of International Application No. PCT/CN2021/126341, filed on Oct. 26, 2021, which claims priority to Chinese Patent Application No. 202011174568.7, filed on Oct. 28, 2020. The entire contents of each of the above-referenced applications are expressly incorporated herein by reference.

TECHNICAL FIELD

This application pertains to the field of communication technologies, and specifically, to a file sending method and apparatus, and an electronic device.

BACKGROUND

Generally, after receiving some files, a chat application program on an electronic device may store these files in a folder in a default path, so that a user can subsequently search the folder for the files when the user needs to use the files. For example, when the user sends a file in the chat application program by using a mail application program, the user may first select a storage directory of the chat application program in a setting application program, and then search a plurality of folders in the storage directory for a required folder, to obtain a storage path of the file, so that the user can send the file by using the mail application program based on the obtained storage path.

However, in the foregoing method, the user needs to perform input for a plurality of times, the user first search a plurality of folders one by one to find a required file, and then sends the file. Consequently, operations of the user are cumbersome and time-consuming, resulting in low file sending efficiency.

SUMMARY

An objective of embodiments of this application is to provide a file sending method and apparatus, and an electronic device.

This application is implemented as follows:

According to a first aspect, an embodiment of this application provides a file sending method, where the file sending method includes: in a case that a conversation interface is displayed, receiving first input of a user, where the conversation interface includes at least one file, and the first input is input performed by the user for a target file in the at least one file; updating the conversation interface to a first interface in response to the first input, where the first interface is a desktop or a target interface displayed based on a storage path of the target file, the desktop includes an identifier of the target file, and the target interface includes the target file; receiving second input of the user, where the second input is input performed by the user for the target file and a target application program; and in response to the second input, sending the target file by using the target application program.

According to a second aspect, an embodiment of this application provides a file sending apparatus, where the file sending apparatus includes: a receiving module, a display module, and a sending module, where the receiving module is configured to: in a case that a conversation interface is displayed, receive first input of a user, where the conversation interface includes at least one file, and the first input is input performed by the user for a target file in the at least one file; the display module is configured to update the conversation interface to a first interface in response to the first input received by the receiving module, where the first interface is a desktop or a target interface displayed based on a storage path of the target file, the desktop includes an identifier of the target file, and the target interface includes the target file; the receiving module is further configured to receive second input of the user, where the second input is input performed by the user for the target file and a target application program; and the sending module is configured to: in response to the second input received by the receiving module, send the target file by using the target application program.

According to a third aspect, an embodiment of the present application provides an electronic device, where the electronic device includes a processor, a memory, and a program or instructions that is or are stored in the memory and capable of running on the processor, and when the program or the instructions is or are executed by the processor, the steps of the file sending method according to the first aspect are implemented.

According to a fourth aspect, an embodiment of this application provides a readable storage medium, where the readable storage medium stores a program or instructions, and when the program or the instructions is or are executed by a processor, the steps of the file sending method according to the first aspect are implemented.

According to a fifth aspect, an embodiment of this application provides a chip, where the chip includes a processor and a communication interface, the communication interface is coupled to the processor, and the processor is configured to run a program or instructions to implement the file sending method according to the first aspect.

In the embodiments of this application, in a case that the conversation interface including the at least one file is displayed, the electronic device may update, based on the first input of the user, the conversation interface to the desktop or the target interface displayed based on the storage path of the target file, so that the user can perform input for the target file and the target application program, and the electronic device sends the target file by using the target application program. The user may directly perform input for the target file in the conversation interface, so that the electronic device jumps to the interface corresponding to the storage path of the target file or the desktop. Therefore, when the user adds the file, the user may quickly add, for sending, the file to the target application program based on the known storage path of the target file, or may directly perform input for the identifier of the target file on the desktop, to quickly add the file to the target application program for sending. The user does not need to send the file by obtaining the storage location of the file by perform searching one by one on the electronic device, thereby reducing time consumed by an operation of the user, and improving file sending efficiency.

DETAILED DESCRIPTION

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without making creative efforts shall fall within the protection scope of this application.

In the specification and claims of this application, the terms "first" and "second" are used to distinguish between similar objects, but are unnecessarily used to describe a specific sequence or order. It should be understood that data terms in such a way is exchangeable in a proper case, so that the embodiments of this application described herein can be implemented in an order other than the order shown or described herein. In addition, objects distinguished by "first", "second", and the like are generally of one type, and a quantity of objects is not limited. For example, there may be one or more first objects. In addition, "and/or" in this specification and the claims represents at least one of the connected objects, and the character "/" generally represents an "or" relationship between the associated objects.

With reference to the accompanying drawings, the following describes, by using a specific embodiment and an application scenario thereof, in detail a file sending method provided in embodiments of this application.

In the embodiments of this application, when a user needs to send a file received by an application program (for example, a chat application program) on an electronic device to another device by using another application program (for example, an email application program), there are two manners. In one manner, the user may directly perform input (for example, perform input through touching and holding or input a file name of a target file) for a target file in a conversation interface of the chat application program, to quickly locate a storage path/location of the target file, so that the user can add the target file to the mail application program based on the storage path of the target file, to quickly send the file. In the other manner, the user may directly perform input (for example, perform input through dragging) for a target file in a conversation interface of the chat application program, so that the electronic device displays a desktop, generates and displays a temporary identifier of the target file on the desktop. In this way, the user may drag the temporary identifier of the target file to an area in which an identifier of the mail application program is located on the desktop, to add the target file to the mail application program, so as to quick send the file.

It should be noted that, in the embodiments of this application, a multi-screen transfer function is supported. That is, the electronic device may include a plurality of screens, and the temporary identifier of the target file may be displayed on one screen. The user may perform input by dragging the temporary identifier of the target file displayed on the screen, to drag the temporary identifier of the target file to the identifier of the mail application displayed on another screen, so as to add the target file.

The embodiments of this application provide a convenient, quick, and easy-to-operate method for adding a file as an attachment of an application program. Input may be performed for a file to obtain a storage location of the file, or a file is directly dragged, to add the file to another application program (that is, an application program in which the file can be added as an attachment) as an attachment. The user does not need to send the file by obtaining the storage location of the file by perform searching one by one on the electronic device, thereby reducing time consumed by an operation of the user, and improving file sending efficiency.

Figure 1:
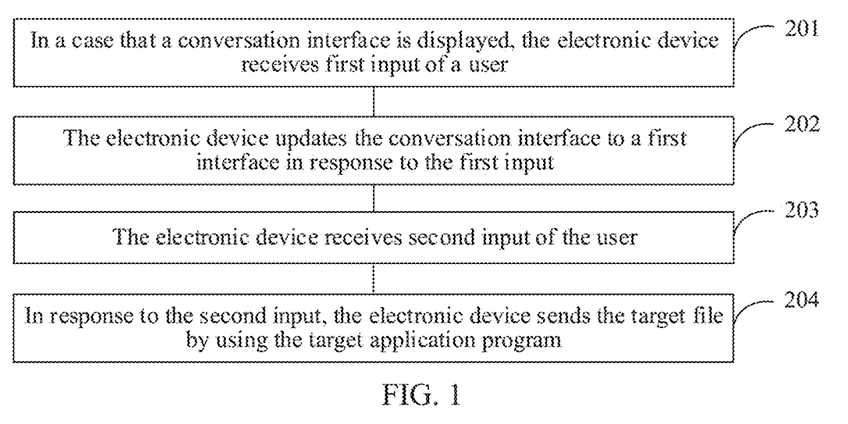
FIG. 1 is a first schematic diagram of a file sending method according to an embodiment of this application.

An embodiment of this application provides a file sending method. FIG. 1 is a flowchart of a file sending method according to an embodiment of this application. The method may be applied to an electronic device. As shown in FIG. 1, the file sending method provided in this embodiment of this application may include the following steps 201 to 204.

Step 201: In a case that a conversation interface is displayed, the electronic device receives first input of a user.

In this embodiment of this application, the conversation interface includes at least one file, and the first input is input performed by the user for a target file in the at least one file.

In this embodiment of this application, in a case that the electronic device displays a conversation interface/a chat interface of an application program (an application program having a message transmission function, such as a chat application program), the user finds a required file in the conversation interface, and then performs input for the file, so that the electronic device displays an interface associated with the file.

For example, in this embodiment of this application, the foregoing first input may be input performed by the user by touching and holding the target file in the conversation interface, to trigger the electronic device to display an option box (that is, a prompt window in the following embodiment) corresponding to the target file. The option box includes a control used to enter a storage location of a file, so that the user can perform input for the control, and the electronic device jumps to an interface corresponding to the storage location of the file.

Figure 2:
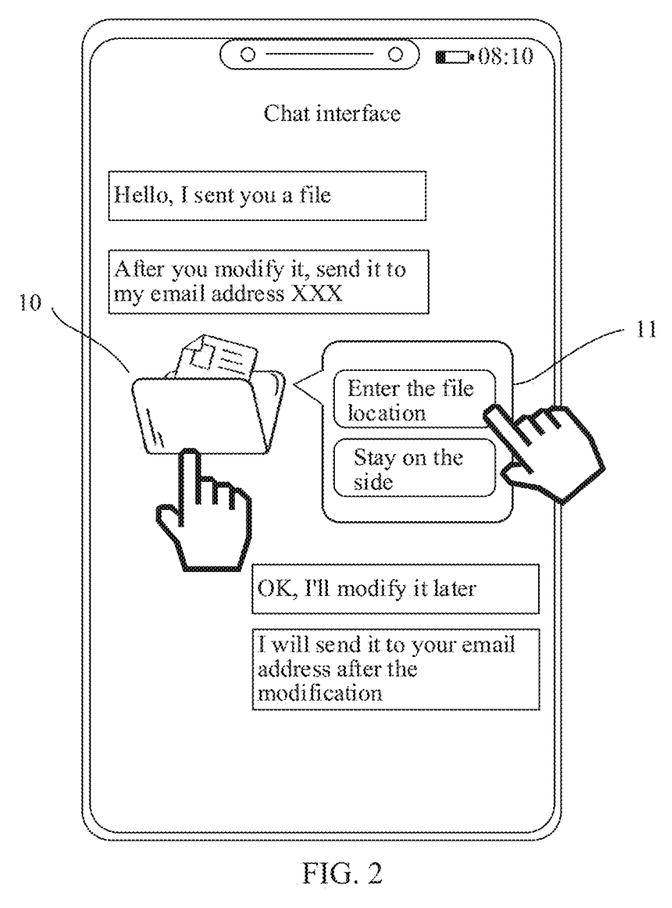
FIG. 2 is a first schematic diagram of an example of an interface of a mobile phone according to an embodiment of this application.

For example, that the electronic device is a mobile phone is used as an example for description. As shown in FIG. 2, the mobile phone displays a chat interface. The chat interface includes a target file 10. The user may perform first input for the target file 10, so that the mobile phone displays an option box 11. The option box 11 includes a control "Enter a file location", so that the user can perform input for the control, and the mobile phone jumps to an interface corresponding to a storage location of the target file 10.

For example, in this embodiment of this application, the foregoing first input may be input performed by the user for a file name of the target file in an input area (that is, a target input area described in the following embodiment) in the conversation interface, to trigger the electronic device to search the electronic device for a corresponding file based on the file name to obtain a storage location of the file, so as to display a window (that is, a prompt window described in the following embodiment). The window includes a storage path of the target file, so that the user can perform input for the storage path (which may be an icon of the storage path) of the target file, and the electronic device jumps to an interface corresponding to the storage location of the file.

Figure 3:
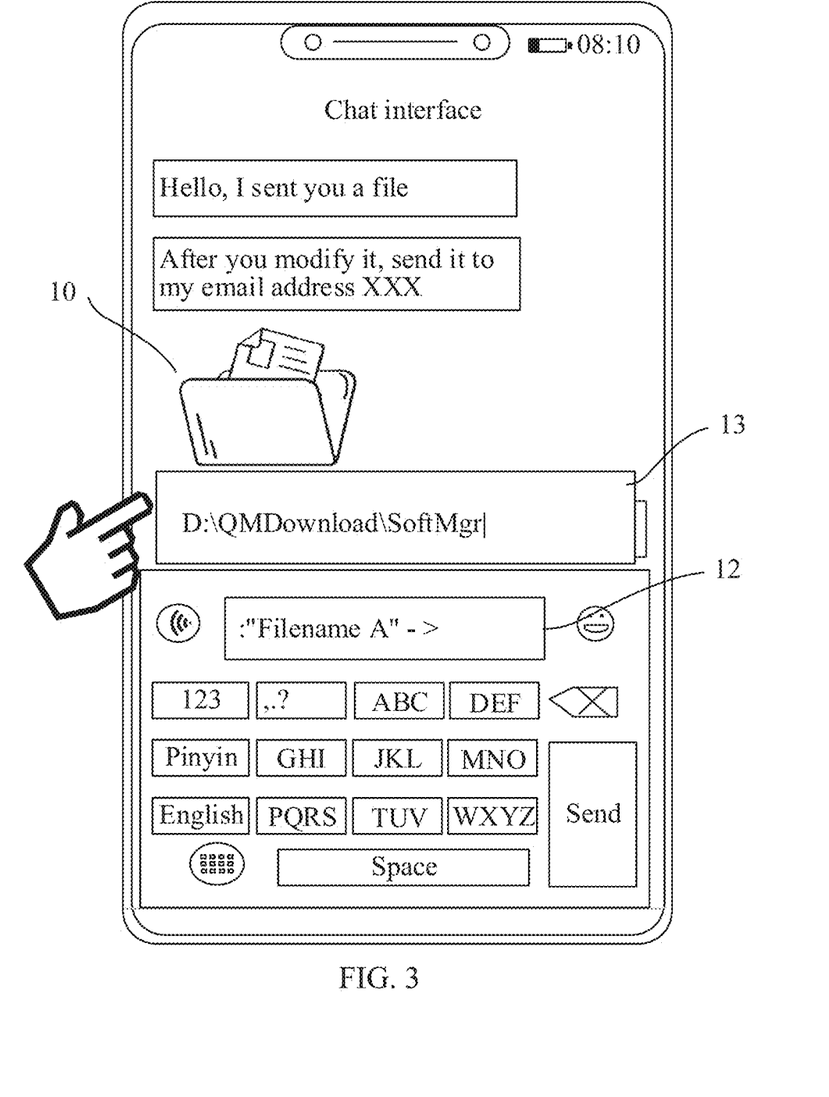
FIG. 3 is a second schematic diagram of an example of an interface of a mobile phone according to an embodiment of this application.

For example, as shown in FIG. 3, the mobile phone displays a chat interface. The chat interface includes a target file 10. The user may perform first input (for example, input a file name "file name A") in an input box 12, so that the mobile phone searches for a file corresponding to the "file name A" to obtain a storage location of the target file 10, and displays a window 13. The window 13 includes a storage path of the target file 10, so that the user can perform input for an icon of the storage path of the target file 10, and the mobile phone jumps to an interface corresponding to the storage location of the target file 10.

For example, in this embodiment of this application, the foregoing first input may be input (for example, an input of dragging the target file to a screen edge area) performed by the user by dragging the target file in the conversation interface, to trigger the electronic device to jump from the conversation interface to a desktop, and display an identifier (for example, an icon of the target file) of the target file on the desktop.

For example, in this embodiment of this application, the electronic device may display the identifier of the target file on the desktop in a preset manner. The preset manner may be any one of the following: a highlight display manner, a gray display manner, a flicker display manner, a dotted-line box mark display manner, and the like.

Figure 4A:
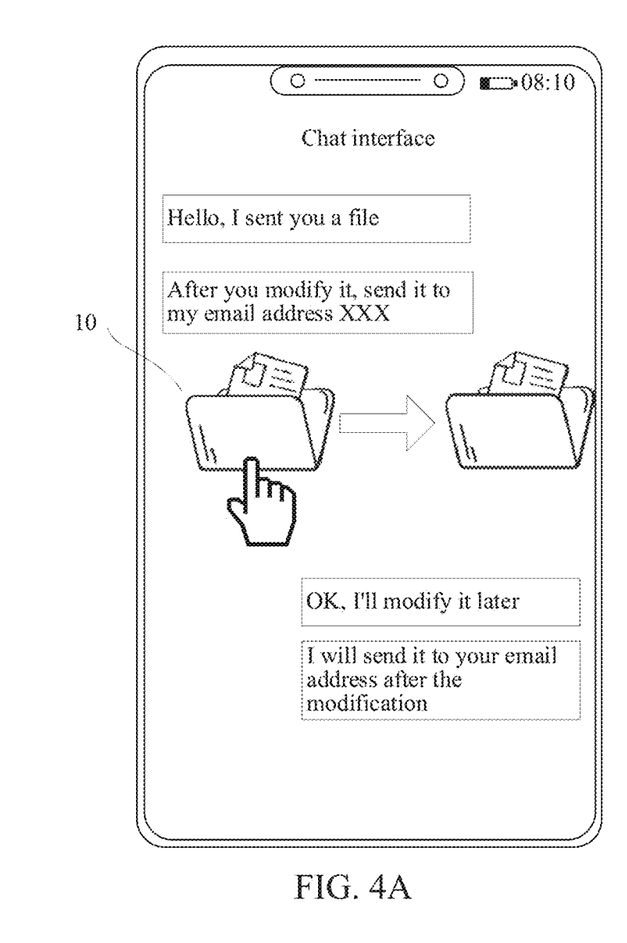
FIGS. 4A and 4B each is a third schematic diagram of an example of an interface of a mobile phone according to an embodiment of this application.

For example, as shown in FIG. 4A, the mobile phone displays a chat interface, and the chat interface includes a target file 10. The user may drag the target file 10 to a screen edge area, so that the mobile phone jumps to a desktop shown in FIG. 4B, so as to display an identifier 14 of the target file 10 on the desktop.

Step 202: The electronic device updates the conversation interface to a first interface in response to the first input.

In this embodiment of this application, the foregoing first interface is a desktop or a target interface displayed based on a storage path of the target file, the desktop includes an identifier of the target file, and the target interface includes the target file.

It should be noted that, the updating the conversation interface to a first interface may be understood as directly jumping from the conversation interface to the first interface; and the target interface displayed based on the storage path of the target file may be understood as a corresponding interface used to store a storage location of the target file.

Figure 5:
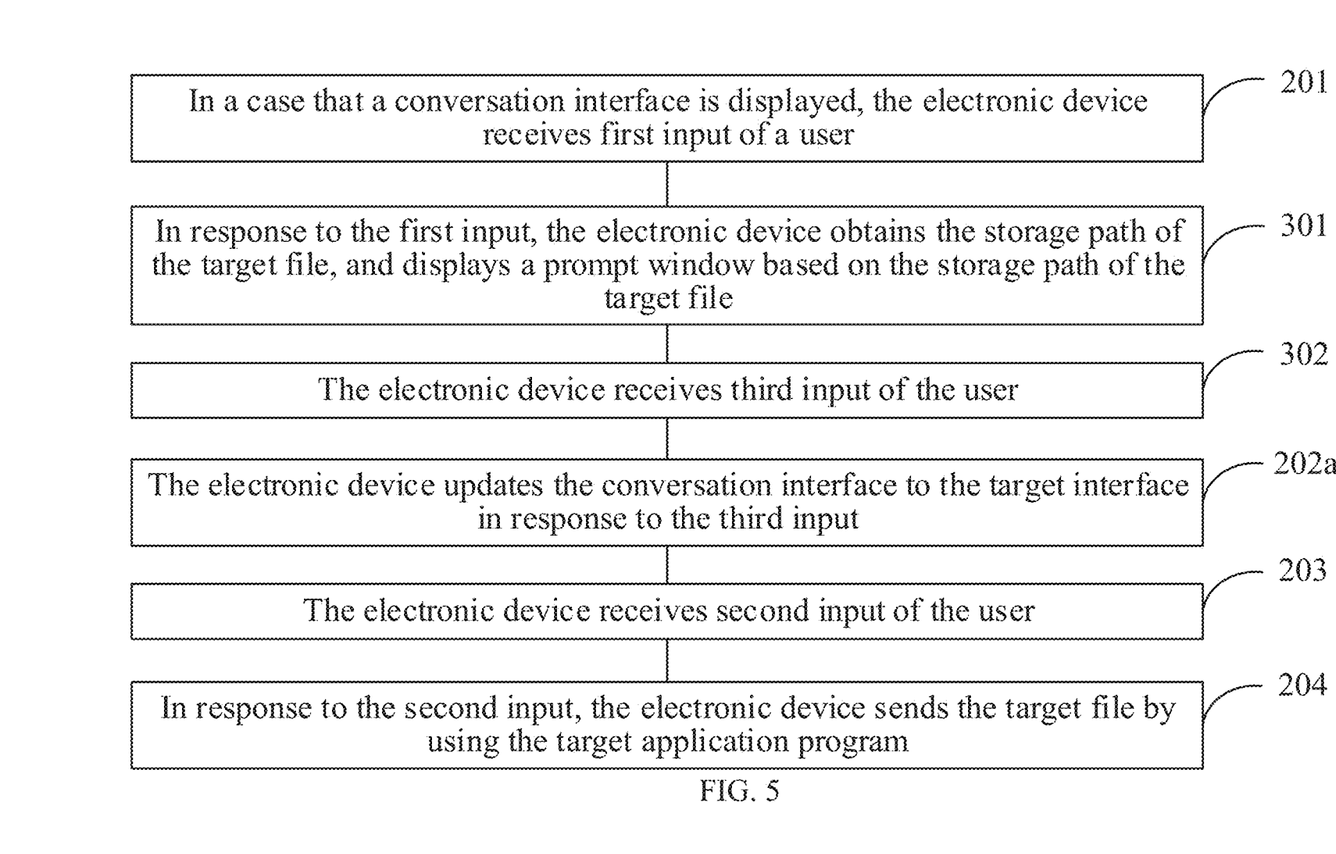
FIG. 5 is a second schematic diagram of a file sending method according to an embodiment of this application.

For example, in an implementation of this embodiment of this application, the first interface is the target interface. With reference to FIG. 1, as shown in FIG. 5, before the "updating the conversation interface to a first interface" in the foregoing step 202, the file sending method provided in this embodiment of this application further includes the following step 301 and step 302, and the foregoing step 202 may be implemented by using the following step 202a.

Step 301: In response to the first input, the electronic device obtains the storage path of the target file, and displays a prompt window based on the storage path of the target file.

In this embodiment of this application, the foregoing prompt window includes at least one of the following: a first control and the storage path of the target file, where the first control is used to display a storage area of a file on the electronic device.

For example, in this embodiment of this application, the prompt window includes at least the storage path of the target file, the conversation interface further includes a target input area, the target input area is used to input a file name of a file, and the first input is input performed by the user for a file name of the target file in the target input area.

It should be noted that, in this manner, the foregoing first input may be input performed by the user by touching and holding the target file in the conversation interface, or input for the file name of the target file in the input area in the conversation interface.

For example, in this embodiment of this application, the target input area may be an input-method input box in the conversation interface, and the user may input the file name of the target file in a target manner (for example, input the file name and a target symbol) in the input-method input box, so that the electronic device can search for the target file. In some alternative embodiments, the target input area may be input performed by the user in the conversation interface, to trigger an input area (the input area is an area used to input a file name) displayed by the electronic device.

It should be noted that, for specific descriptions of the first control and the storage path of the target file, refer to related descriptions of the foregoing first input. Details are not described herein again.

For example, in this embodiment of this application, the "obtaining the storage path of the target file" in the foregoing step 301 may be implemented by using the following step 301a.

Step 301a: The electronic device determines, from a storage area on the electronic device based on the file name of the target file, a file corresponding to the file name of the target file, to obtain the storage path of the target file.

It should be noted that, the storage area of the electronic device may be understood as an area that is on the electronic device and that is used to store a file, for example, a file (for example, a file received by using each application program) of an application program or a configuration file. The electronic device may perform global searching to find, from all files, a file corresponding to a file name input by the user, thereby determining a storage location/storage path of the file on the electronic device.

Step 302: The electronic device receives third input of the user.

For example, in this embodiment of this application, the foregoing third input (for example, input performed through tapping) may be input performed by the user for the first control in the prompt window. In some alternative embodiments, the foregoing third input may be input performed by the user for an identifier of the storage path of the target file in the prompt window.

Step 202a: The electronic device updates the conversation interface to the target interface in response to the third input.

In this embodiment of this application, the user may directly perform input (for example, perform input through touching and holding or input a file name) for the target file in the conversation interface, to quickly obtain the storage location of the file. In this way, subsequently, the user can quickly add the file to a target application program in a timely manner for sending, to improve file sending efficiency.

Step 203: The electronic device receives second input of the user.

In this embodiment of this application, the foregoing second input is input performed by the user for the target file and the target application program.

For example, in this embodiment of this application, in a case that the foregoing first interface is the target interface, the foregoing second input is input performed by the user for an identifier of the target application program and the target file. In some embodiments, the user may perform input for the identifier of the target application program, to open the target application program (for example, an email application program). Then, the user may add an attachment to the target application program, that is, enter, based on the storage path of the target file, a file directory corresponding to the target file, to perform selection and input for the target file, so as to add the target file to the target application program to complete file sending.

For example, in this embodiment of this application, after the user triggers the electronic device to add the target file to the target application program, the user may edit mail content in the target application program, and then complete mail sending.

For example, in this embodiment of this application, the first interface is the target interface. Before the foregoing step 203, the file sending method provided in this embodiment of this application further includes the following step 401 and step 402.

Step 401: The electronic device receives fourth input of the user.

In this embodiment of this application, the foregoing fourth input is input performed by the user for the target file in the target interface.

In this embodiment of this application, the foregoing fourth input is input (for example, input for a moving control) performed by the user based on a file moving function, to trigger the electronic device to move the target file displayed in the target interface to another folder.

Step 402: The electronic device moves the target file to a target folder in response to the fourth input.

For example, in this embodiment of this application, the foregoing target folder may be a folder created in advance by the user or a folder created for the target file.

For example, in this embodiment of this application, the user may create a folder at an easy-to-remember storage location in advance and name the folder, so that the user can subsequently move the target file to the newly created folder.

For example, in this embodiment of this application, after the user moves the target file to the created folder, the user may modify the name of the folder.

In this embodiment of this application, before the target file is added to the target application program, the user may first move the target file to a folder whose storage location is known to the user. Therefore, when the target file is subsequently added to the target application program, the target file may be found more quickly, to quickly add the file.

For example, in this embodiment of this application, in a case that the first interface is the desktop, the desktop further includes an identifier of the target application program, and the second input is input performed by the user by dragging the identifier of the target file to the identifier of the target application program.

Figure 4B:
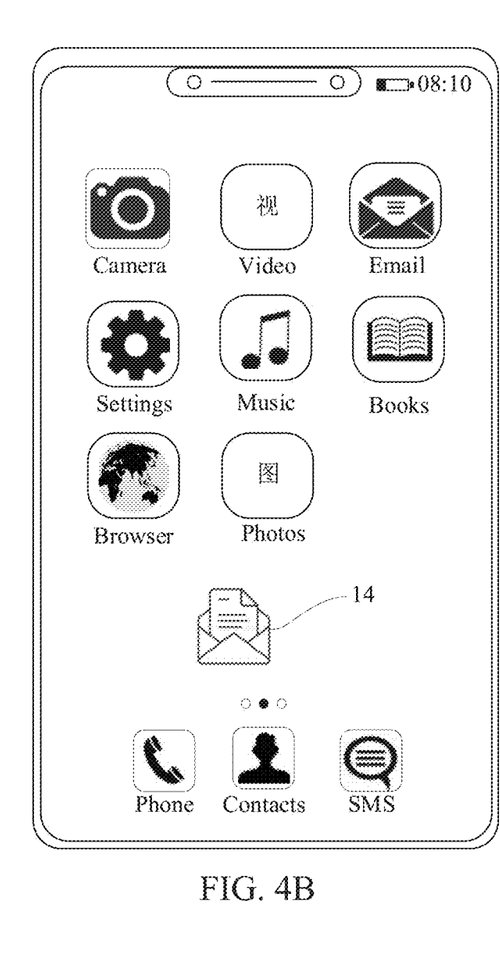
Figure 6:
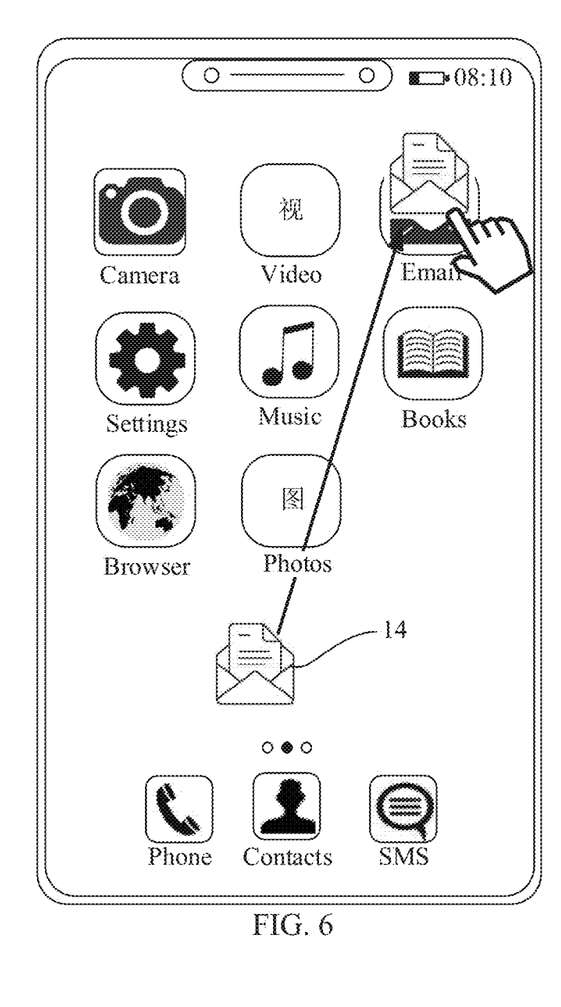
FIG. 6 is a fourth schematic diagram of an example of an interface of a mobile phone according to an embodiment of this application.

For example, with reference to FIG. 4B, as shown in FIG. 6, the user may drag the identifier 14 of the target file 10 displayed on the desktop to an icon of the mail application, so that the mobile phone adds the target file 10 to the mail application.

Step 204: In response to the second input, the electronic device sends the target file by using the target application program.

In this embodiment of this application, the electronic device may add the target file to the target application program based on the second input of the user, to send the target file by using the target application program.

Figure 7:
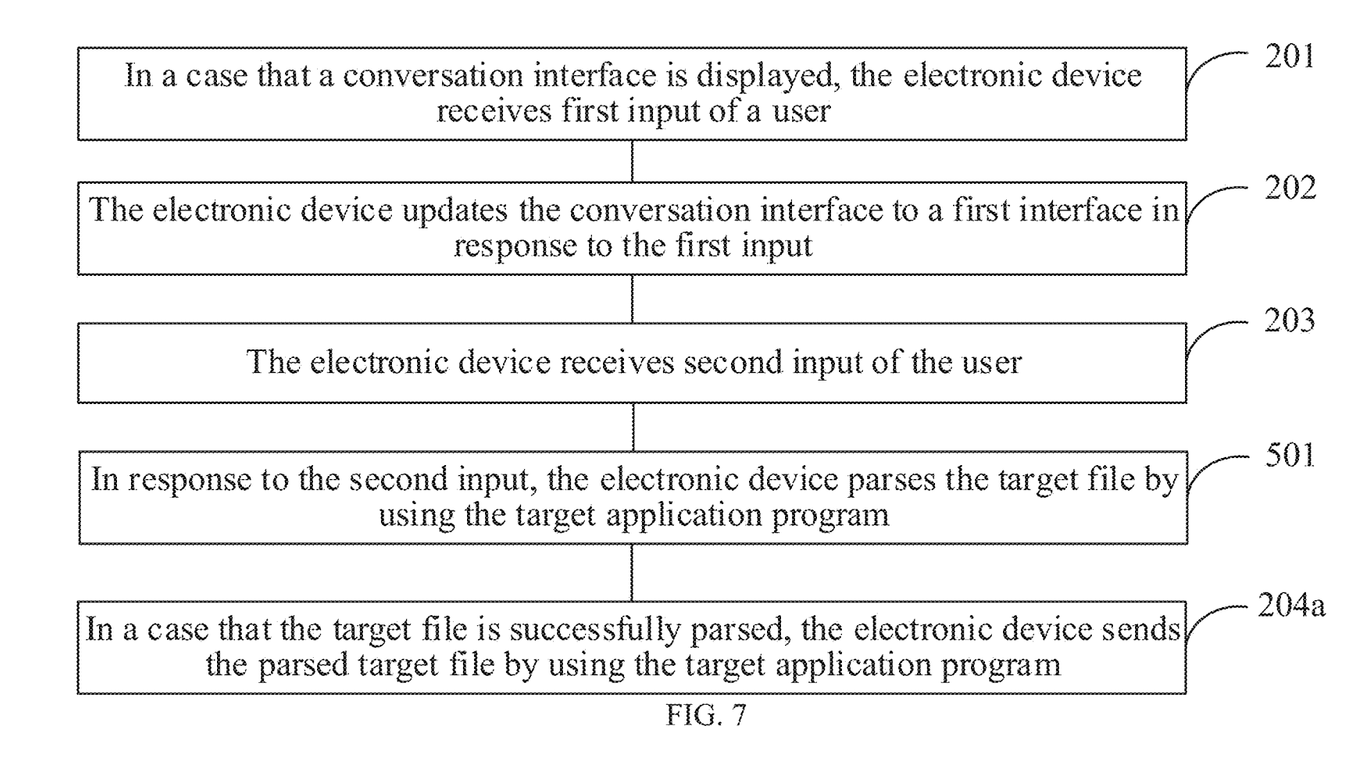
FIG. 7 is a third schematic diagram of a file sending method according to an embodiment of this application.

For example, in another implementation of this embodiment of this application, the foregoing first interface is the desktop. With reference to FIG. 1, as shown in FIG. 7, before the "sending the target file by using the target application program" in the foregoing step 204, the file sending method provided in this embodiment of this application further includes the following step 501, and the foregoing step 204 may be implemented by using the following step 204a.

Step 501: In response to the second input, the electronic device parses the target file by using the target application program.

For example, in this embodiment of this application, the electronic device may parse the target file to obtain a format of the target file, content of the target file, storage space occupied by the target file, and the like.

Step 204a; In a case that the target file is successfully parsed, the electronic device sends the parsed target file by using the target application program.

For example, in this embodiment of this application, after sending the target file by using the target application program, the electronic device may cancel displaying the identifier of the target file on the desktop.

For example, in this embodiment of this application, if the electronic device cannot parse the target file or fails to parse the target file, the electronic device does not add the target file to the target application program for sending, and cancels displaying the identifier of the target file on the desktop.

In the file sending method provided in this embodiment of this application, in a case that the conversation interface including the at least one file is displayed, the electronic device may update, based on the first input of the user, the conversation interface to the desktop or the target interface displayed based on the storage path of the target file, so that the user can perform input for the target file and the target application program, and the electronic device sends the target file by using the target application program. The user may directly perform input for the target file in the conversation interface, so that the electronic device jumps to the interface corresponding to the storage path of the target file or the desktop. Therefore, when the user adds the file, the user may quickly add, for sending, the file to the target application program based on the known storage path of the target file, or may directly perform input for the identifier of the target file on the desktop, to quickly add the file to the target application program for sending. The user does not need to send the file by obtaining the storage location of the file by perform searching one by one on the electronic device, thereby reducing time consumed by an operation of the user, and improving file sending efficiency.

It should be noted that, the file sending method provided in this embodiment of this application may be performed by a file sending apparatus, or a control module that is in the file sending apparatus and that is configured to perform the file sending method. In this embodiment of this application, that the file sending apparatus performs the file sending method is used as an example to describe the file sending apparatus provided in this embodiment of this application.

Figure 8:
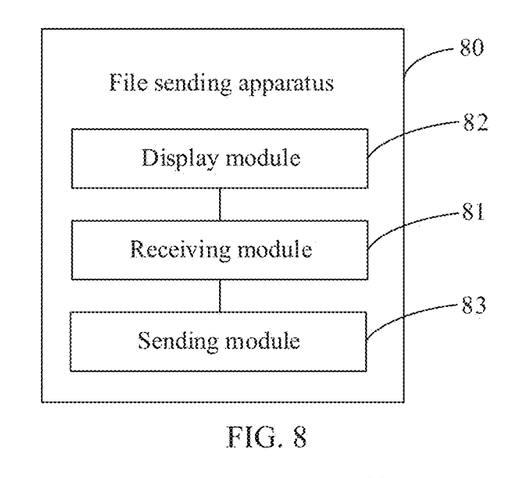
FIG. 8 is a schematic diagram of a structure of a file sending apparatus according to an embodiment of this application.

FIG. 8 is a schematic diagram of a possible structure of a file sending apparatus according to an embodiment of this application. As shown in FIG. 8, the file sending apparatus 80 may include a receiving module 81, a display module 82, and a sending module 83.

The receiving module 81 is configured to: in a case that a conversation interface is displayed, receive first input of a user, where the conversation interface includes at least one file, and the first input is input performed by the user for a target file in the at least one file. The display module 82 is configured to update the conversation interface to a first interface in response to the first input received by the receiving module 81, where the first interface is a desktop or a target interface displayed based on a storage path of the target file, the desktop includes an identifier of the target file, and the target interface includes the target file. The receiving module 81 is further configured to receive second input of the user, where the second input is input performed by the user for the target file and a target application program. The sending module 83 is configured to: in response to the second input received by the receiving module 81, send the target file by using the target application program.

In a possible implementation, the first interface is the target interface. The file sending apparatus 80 provided in this embodiment of this application further includes an obtaining module. The obtaining module is configured to: before the display module 82 updates the conversation interface to the first interface, obtain the storage path of the target file. The display module 82 is further configured to display a prompt window based on the storage path that is of the target file and that is obtained by the obtaining module, where the prompt window includes at least one of the following: a first control and the storage path of the target file, where the first control is used to display a storage area of a file on an electronic device. The receiving module 81 is further configured to receive third input of the user. The display module 82 is configured to update the conversation interface to the target interface in response to the third input received by the receiving module 81.

In a possible implementation, the prompt window includes at least the storage path of the target file, the conversation interface further includes a target input area, the target input area is used to input a file name of a file, and the first input is input performed by the user for a file name of the target file in the target input area. The obtaining module is configured to determine, from a storage area on the electronic device based on the file name of the target file, a file corresponding to the file name of the target file, to obtain the storage path of the target file.

In a possible implementation, the receiving module 81 is further configured to: before receiving the second input of the user, receive fourth input of the user, where the fourth input is input performed by the user for the target file in the target interface. The file sending apparatus 80 provided in this embodiment of this application further includes a moving module. The moving module is configured to move the target file to a target folder in response to the fourth input received by the receiving module 81, where the target folder is a folder created by the user.

In a possible implementation, the first interface is the desktop, the desktop further includes an identifier of the target application program, and the second input is input performed by the user by dragging the identifier of the target file to the identifier of the target application program. The file sending apparatus 80 provided in this embodiment of this application further includes a parsing module. The parsing module is configured to: before the sending module 83 sends the target file by using the target application program, parse the target file by using the target application program. The sending module 83 is configured to: in a case that the target file is successfully parsed, send the parsed target file by using the target application program.

According to the file sending apparatus provided in this embodiment of this application, the user may directly perform input for the target file in the conversation interface, so that the electronic device jumps to the interface corresponding to the storage path of the target file or the desktop. Therefore, when the user adds the file, the user may quickly add, for sending, the file to the target application program based on the known storage path of the target file, or may directly perform input for the identifier of the target file on the desktop, to quickly add the file to the target application program for sending. The user does not need to send the file by obtaining the storage location of the file by perform searching one by one on the electronic device, thereby reducing time consumed by an operation of the user, and improving file sending efficiency.

The file sending apparatus in this embodiment of this application may be an apparatus, or may be a component, an integrated circuit, or a chip in a terminal. The apparatus may be a mobile electronic device or may be a non-mobile electronic device. For example, the mobile electronic device may be a mobile phone, a tablet computer, a notebook computer, a palm computer, an in-vehicle electronic device, a wearable device, an Ultra-Mobile Personal Computer (UMPC), a netbook, or a Personal Digital Assistant (PDA). The non-mobile electronic device may be a server, a Network Attached Storage (NSA), a Personal Computer (PC), a Television (TV), a teller machine, or an automated machine. This is not specifically limited in this embodiment of this application.

The file sending apparatus in this embodiment of this application may be an apparatus with an operating system. The operating system may be an Android operating system, may be an iOS operating system, or may be another possible operating system. This is not specifically limited in this embodiment of this application.

The file sending apparatus provided in this embodiment of this application can implement various processes implemented in the foregoing method embodiments. To avoid repetition, details are not described herein again.

Figure 9:
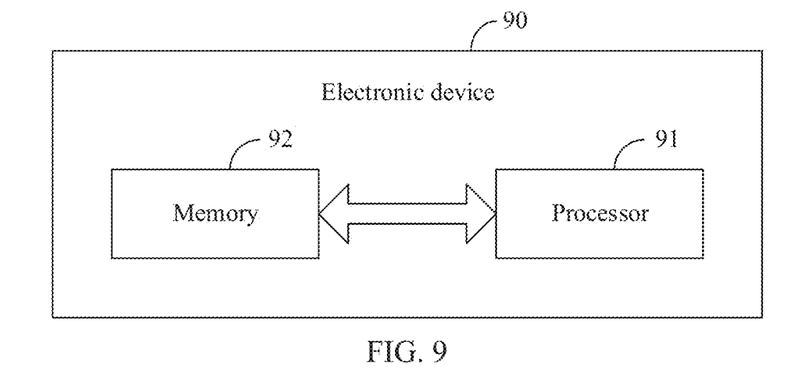
FIG. 9 is a first schematic diagram of a hardware structure of an electronic device according to an embodiment of this application.

For example, as shown in FIG. 9, an embodiment of this application further provides an electronic device 90, including a processor 91, a memory 92, and a program or instructions stored in the memory 92 and capable of running on the processor 91. When the program or the instructions is or are executed by the processor 91, various processes in the foregoing method embodiments are implemented, and a same technical effect can be achieved. To avoid repetition, details are not described herein again.

It should be noted that, the electronic device in this embodiment of this application includes the foregoing mobile electronic device and non-mobile electronic device.

Figure 10:
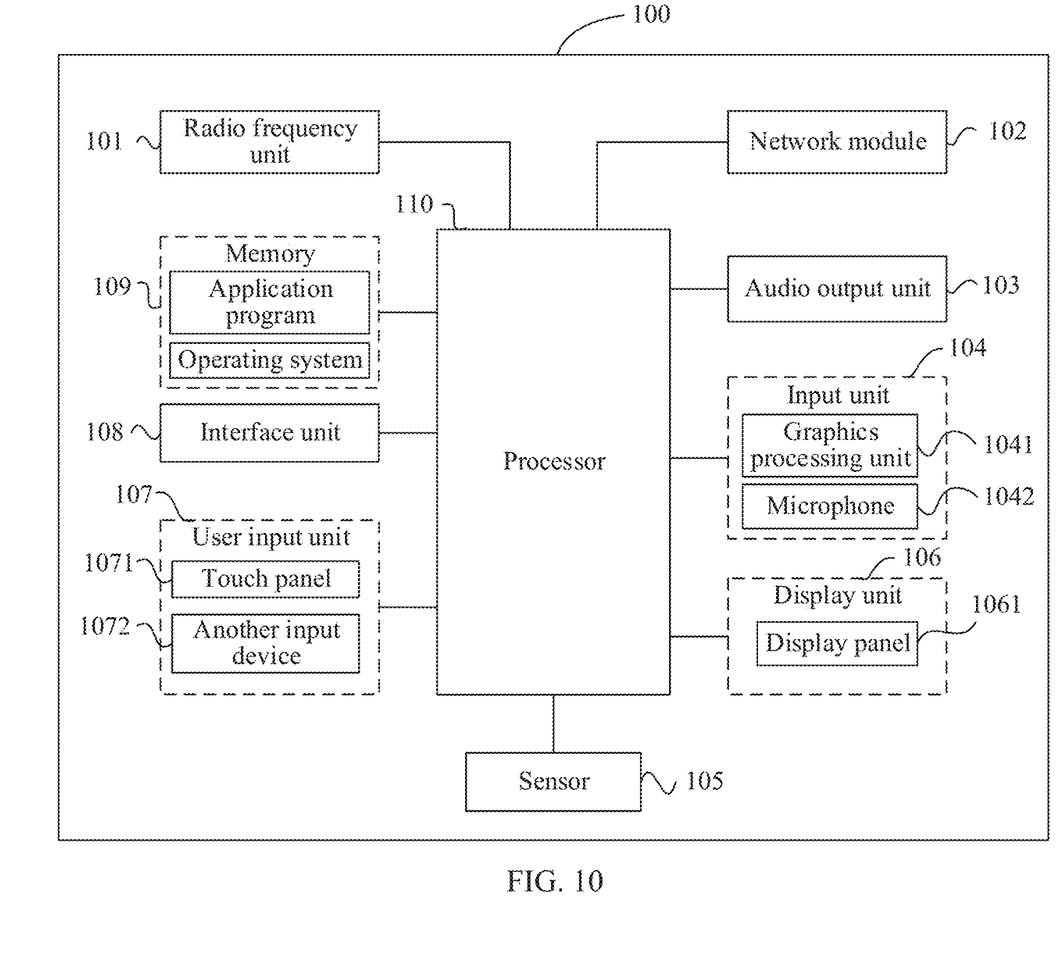
FIG. 10 is a second schematic diagram of a hardware structure of an electronic device according to an embodiment of this application.

FIG. 10 is a second schematic diagram of a hardware structure of an electronic device that implements an embodiment of this application.

The electronic device 100 includes but is not limited to a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the electronic device 100 may further include a power supply (for example, a battery) that supplies power to each component. The power supply may be logically connected to the processor 110 by using a power management system, to manage functions such as charging, discharging, and power consumption by using the power management system. The structure of the electronic device shown in FIG. 10 constitutes no limitation on the electronic device, and the electronic device may include more or fewer components than those shown in the figure, or combine some components, or have different component arrangements. Details are not described herein again.

The user input unit 107 is configured to: in a case that a conversation interface is displayed, receive first input of a user, where the conversation interface includes at least one file, and the first input is input performed by the user for a target file in the at least one file.

The display unit 106 is configured to update the conversation interface to a first interface in response to the first input, where the first interface is a desktop or a target interface displayed based on a storage path of the target file, the desktop includes an identifier of the target file, and the target interface includes the target file.

The user input unit 107 is further configured to receive second input of the user, where the second input is input performed by the user for the target file and a target application program.

The network module 102 is configured to: in response to the second input, send the target file by using the target application program.

According to the electronic device provided in this embodiment of this application, the user may directly perform input for the target file in the conversation interface, so that the electronic device jumps to the interface corresponding to the storage path of the target file or the desktop. Therefore, when the user adds the file, the user may quickly add, for sending, the file to the target application program based on the known storage path of the target file, or may directly perform input for the identifier of the target file on the desktop, to quickly add the file to the target application program for sending. The user does not need to send the file by obtaining the storage location of the file by perform searching one by one on the electronic device, thereby reducing time consumed by an operation of the user, and improving file sending efficiency.

It should be understood that, in this embodiment of this application, the input unit 104 may include a Graphics Processing Unit, GPU 1041 and a microphone 1042. The graphics processing unit 1041 processes image data of a still picture or a video obtained by an image capture apparatus (such as a camera) in a video capture mode or an image capture mode. The display unit 106 may include a display panel 1061. The display panel 1061 may be configured in a form such as a liquid crystal display or an organic light-emitting diode. The user input unit 107 may include a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a function key (such as a volume control key or an on/off key), a trackball, a mouse, and a joystick. Details are not described herein. The memory 109 may be configured to store a software program and various data, including but not limited to an application program and an operating system. The processor 110 may integrate an application processor and a modem processor, where the application processor mainly processes an operating system, a user interface, an application program, and the like, and the modem processor mainly processes wireless communication. It may be understood that the modem processor may not be integrated into the processor 110.

An embodiment of this application further provides a readable storage medium. The readable storage medium stores a program or instructions. When the program or the instructions is or are executed by a processor, various processes in the foregoing method embodiments are implemented, and a same technical effect can be achieved. To avoid repetition, details are not described herein again.

The processor is a processor in the electronic device in the foregoing embodiment. The readable storage medium includes a computer-readable storage medium such as a Read-Only Memory (ROM), a Random Access Memory (RAM), a magnetic disk, or an optical disc.

An embodiment of this application further provides a chip. The chip includes a processor and a communication interface. The communication interface is coupled to the processor. The processor is configured to run a program or instructions to implement various processes in the foregoing method embodiments, and a same technical effect can be achieved. To avoid repetition, details are not described herein again.

It should be understood that the chip mentioned in this embodiment of this application may also be referred to as a system-level chip, a system chip, a chip system, or a system on chip.

It should be noted that, the terms "include", "comprise", or any other variation thereof in this specification are intended to cover a non-exclusive inclusion, so that a process, method, article, or apparatus that includes a list of elements includes the elements, and also includes other elements that are not expressly listed, or further includes elements inherent to such a process, method, article, or apparatus. Without more limitations, elements defined by the sentence "including one" does not exclude that there are still other same elements in the processes, methods, objects, or apparatuses that include the elements. In addition, it should be noted that the scope of the method and apparatus in the embodiments of this application is not limited to performing a function in a sequence shown or discussed, and may further include performing a function in a basically simultaneous manner or in a reverse sequence based on a related function. For example, the described method may be performed in an order from the described order, and various steps may be added, omitted, or combined. In addition, features described with reference to some examples may be combined in other examples.

Based on the descriptions in the foregoing implementations, a person skilled in the art may clearly learn that the method in the foregoing embodiment may be implemented by software in addition to a necessary universal hardware platform or by hardware only. In most circumstances, the former is a better implementation. Based on such an understanding, the technical solutions of this application essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing specific implementations. The foregoing specific implementations are merely examples, and are not restrictive. Under the enlightenment of this application, many forms may be further made by a person of ordinary skill in the art without departing from the objective of this application and the protection scope of the claims and shall fall within the protection scope of this application.

What is claimed is:

1. A file sending method, comprising:
when a conversation interface is displayed, receiving first input of a user, wherein the conversation interface comprises at least one file to be sent to another user, and the first input is performed by the user for a target file in the at least one file;
displaying a first interface in response to the first input, wherein the first interface is a desktop displaying thereon an icon identifying the target file and an icon identifying a target application program;
receiving second input of the user, wherein the second input is performed by the user to add the target file to the target application program, wherein the second input comprises dragging the icon identifying the target file to an area where the icon of the target application program is located;
in response to the second input, parsing the target file by using the target application program; and
when the target file is successfully parsed, sending the parsed target file by using the target application program,
wherein:
the first interface further comprises a target interface;
before displaying the first interface, the method further comprises:
obtaining the storage path of the target file, and displaying a prompt window based on the storage path of the target file, wherein the prompt window comprises at least one of the following: a first control or the storage path of the target file, wherein the first control is used to display a storage area of a file on an electronic device, and receiving third input of the user;
displaying the first interface comprises:
displaying the target interface in response to the third input; and
before receiving the second input of the user, the method further comprises:
receiving fourth input of the user, wherein the fourth input is input performed by the user for the target file in the target interface, and
moving the target file to a target folder in response to the fourth input.

2. The file sending method according to claim 1,
wherein:
the prompt window comprises at least the storage path of the target file,
the conversation interface further comprises a target input area,
the target input area is used to input a file name of a file, and
the first input is input performed by the user for a file name of the target file in the target input area; and
wherein the obtaining the storage path of the target file comprises:
determining, from a storage area on the electronic device based on the file name of the target file, the file corresponding to the file name of the target file, to obtain the storage path of the target file.

3. An electronic device, comprising a processor; and a memory having a computer program or instructions stored thereon, wherein the computer program or the instructions, when executed by the processor, causes the processor to perform operations comprising:
when a conversation interface is displayed, receiving first input of a user, wherein the conversation interface comprises at least one file to be sent to another user, and the first input is performed by the user for a target file in the at least one file;
displaying a first interface in response to the first input, wherein the first interface is a desktop displaying thereon an icon identifying the target file and an icon identifying a target application program;
receiving second input of the user, wherein the second input is input performed by the user to add the target file to the target application program, wherein the second input comprises dragging the icon identifying the target file to an area where the icon of the target application program is located;
in response to the second input, parsing the target file by using the target application program; and
when the target file is successfully parsed, sending the parsed target file by using the target application program,
wherein:
the first interface further comprises a target interface;
before displaying the first interface, the operations further comprise:
obtaining the storage path of the target file, and displaying a prompt window based on the storage path of the target file, wherein the prompt window comprises at least one of the following: a first control or the storage path of the target file, wherein the first control is used to display a storage area of a file on an electronic device, and receiving third input of the user;
displaying the first interface comprises:
displaying the target interface in response to the third input; and
before receiving the second input of the user, the operations further comprise:
receiving fourth input of the user, wherein the fourth input is input performed by the user for the target file in the target interface, and
moving the target file to a target folder in response to the fourth input.

4. The electronic device according to claim 3,
wherein:
the prompt window comprises at least the storage path of the target file,
the conversation interface further comprises a target input area,
the target input area is used to input a file name of a file, and
the first input is input performed by the user for a file name of the target file in the target input area; and
wherein the obtaining the storage path of the target file comprises:
determining, from a storage area on the electronic device based on the file name of the target file, the file corresponding to the file name of the target file, to obtain the storage path of the target file.

5. A non-transitory computer readable storage medium, storing a computer program or instructions that, when executed by a processor, cause the processor to perform operations comprising:
- when a conversation interface is displayed, receiving first input of a user, wherein the conversation interface comprises at least one file to be sent to another user, and the first input is input performed by the user for a target file in the at least one file;
- displaying a first interface in response to the first input, wherein the first interface is a desktop displaying thereon an icon identifying the target file and an icon identifying a target application program;
- receiving second input of the user, wherein the second input is input performed by the user to add the target file to the target application program, wherein the second input comprises dragging the icon identifying the target file to an area where the icon of the target application program is located;
- in response to the second input, parsing the target file by using the target application program; and
- when the target file is successfully parsed, sending the parsed target file by using the target application program, wherein:
the first interface further comprises a target interface;
before displaying the first interface, the operations further comprise:
obtaining the storage path of the target file, and displaying a prompt window based on the storage path of the target file, wherein the prompt window comprises at least one of the following: a first control or the storage path of the target file, wherein the first control is used to display a storage area of a file on an electronic device, and receiving third input of the user;
displaying the first interface comprises:
displaying the target interface in response to the third input; and
before receiving the second input of the user, the operations further comprise:
receiving fourth input of the user, wherein the fourth input is input performed by the user for the target file in the target interface, and
moving the target file to a target folder in response to the fourth input.

6. The non-transitory computer readable storage medium according to claim 5,
wherein:
the prompt window comprises at least the storage path of the target file,
the conversation interface further comprises a target input area,
the target input area is used to input a file name of a file, and
the first input is input performed by the user for a file name of the target file in the target input area; and
wherein the obtaining the storage path of the target file comprises:
determining, from a storage area on the electronic device based on the file name of the target file, the file corresponding to the file name of the target file, to obtain the storage path of the target file.

* * * * *